United States Patent [19]

Haber et al.

[11] Patent Number: 5,781,629

[45] Date of Patent: Jul. 14, 1998

[54] DIGITAL DOCUMENT AUTHENTICATION SYSTEM

[75] Inventors: Stuart A. Haber, New York, N.Y.; W. Scott Stornetta, Jr., Morriston, Jr., N.J.

[73] Assignee: Surety Technologies, Inc., Florham Park, N.J.

[21] Appl. No.: 803,326

[22] Filed: Feb. 21, 1997

Related U.S. Application Data

[63] Continuation of Ser. No. 330,459, Oct. 28, 1994, abandoned.

[51] Int. Cl.⁶ ........................................................ H04L 9/32
[52] U.S. Cl. ............................................. 380/23; 380/28
[58] Field of Search .................................... 380/23, 28, 30

[56] References Cited

U.S. PATENT DOCUMENTS

| Re. 34,954 | 5/1995 | Haber et al. ............... 380/49 |
| 4,309,569 | 1/1982 | Merkle . |
| 4,405,829 | 9/1983 | Rivest et al. . |
| 4,881,264 | 11/1989 | Meakle ...................... 380/25 |
| 5,136,646 | 8/1992 | Haber et al. . |
| 5,136,647 | 8/1992 | Haber et al. . |
| 5,373,561 | 12/1994 | Haber et al. . |
| 5,432,852 | 7/1995 | Leighton et al. ............ 380/30 |

OTHER PUBLICATIONS

Bayes, et al., "*Improving the Efficiency and the Reliability of Digital Time–Stamping*", sequences II methods in communication, security, and computer science, editors R.M. Capocelli, et al. pp. 329–334, (Springer–Verlag, New York 1993).

Haber et al., "*How to Time–Stamp a Digital Document*", Journal of Cryptography, vol. 3, No. 2, pp. 99–111 (1991).

*Primary Examiner*—Gilberto Barron, Jr.
*Attorney, Agent, or Firm*—Meltzer, Lippe, Goldstein, et al.

[57] ABSTRACT

A process for time-stamping a digital document is provided. The process provides a certificate which not only allows for the authentication of a document at a later time but which includes a name or nickname which allows for the unique identification of the document at a later time. The name or nickname provided in accordance with the present invention is not only simple and concise but allows for the self-authentication of the document which it refers to. The name can be used when two independent parties desire to refer to the same unique document in a quick and simple way.

74 Claims, 8 Drawing Sheets

What's in a name? That which we call a rose
By any other word would smell as sweet.
So Romeo would, were he not Romeo called,
Retain that perfection which he owes
Without that title. Romeo, doff thy name;
And for thy name, which is no part of thee,
Take all myself.

```
┌─────────────────────────────────────┐
│ RRLLRR - 8/18/94  7:37:25  AM  EDT  │
└─────────────────────────────────────┘
                    ╱ 55
```

DIGITAL DOCUMENT AUTHENTICATION SYSTEM

This is a continuation of application Ser. No. 08/330,459, filed Oct. 28, 1994, abandoned.

BACKGROUND OF THE INVENTION

This invention relates to a digital document authentication system which authenticates and uniquely identifies a document. More particularly, this invention relates to a digital document time-stamping system which provides a unique, user-friendly and cryptographically secure name for a digital document by means of an authentication certificate.

In many situations there is a need to establish the date and time at which a document was created and to prove that the document in question has not been modified since then. This problem is especially acute with respect to digital documents because they are so easy to alter, since they are generally stored in digital form on an easily changeable medium that provides no indication of past history. However it is stored, it is easy to make a perfect copy of a digital document—so easy that it rarely makes any sense to speak of "the original copy" of a computer-based document. Any of these copies can be easily altered, either in major or minor ways. By contrast, there are much better guarantees of the integrity of paper documents. For example, making a change to a paper document of any sort, even a small change, typically leaves physical forensic evidence.

In recent years, a number of digital time-stamping systems have been proposed. For example, U.S. Pat. Nos. 5,136,647 and 5,136,646, which are hereby incorporated by reference in their entirety, describe such systems. The system described in the U.S. Pat. No. 5,136,646 patent provides an authentication certificate which includes, in addition to a Transaction Number, Client ID Number, Time and Date, a Certificate Number. In order to verify the authenticity of a document, the records of the time-stamping "authority" are examined in connection with the Certificate Number at-issue.

An improved system is described in "Improving the Efficiency and Reliability of Digital Time-Stamping," by D. Bayer, S. Haber and W. S. Stornetta (in Sequences II: Methods in Communication, Security, and Computer Science, ed. R. M. Capocelli, A. DeSantis and U. Vaccaro, pp. 329–334, Springer-Verlag New York, 1993). To verify the authenticity of a document time-stamped with a system based on a binary tree, that article suggests retaining the set of hash values that were directly combined with the document-at-issue's hash value along the path to the published root of the tree (along with the "handedness" of those hash values). Authentication consists of recomputing the root of the tree from this data. If a "trustworthy" certificate occurs about every N documents, this system reduces the cost of verification from N to log N over a system based on linear linking such as that described in "How to Time-Stamp a Digital Document," by S. Haber and W. S. Stornetta, Journal of Cryptography, Vol. 3, No. 2, pp. 99–111 (1991).

The digital time-stamping systems described above provide users a way to "register" any of their digital documents. A "document," of course, can be any sequence of bits, representing the words of a written document, the form of a printed text, recorded sound or digitized video, for example. As a result of so registering a document, the user receives a time-stamp "certificate" that attests to the time of registration and content of the document. When any user is presented with a digital document and its time-stamp certificate, the user can validate that the given certificate was indeed computed for the given document at the time claimed; if that is not the case, then the (document, certificate) pair will fail the validation or authentication test.

Although the above-described systems perform their intended function, there is always a need for further improvement. For example, systems which allow users to simplify their digital document needs are always welcome. In particular, consider the situation of two parties who are working on multiple versions of a document that they create, modify, transmit, and store in digital form. The parties may be authors or scientists collaborating on an article, auditors or analysts reviewing accounting records or lawyers negotiating a contract or other persons whose work involves intensive creation or manipulation of digital documents. Such parties need a convenient way to refer to the documents they use, in order to keep records and in order to communicate with each other. Preferably, names for documents should be concise and easy to refer to. Also, a name should be unambiguous, at least in the context of its use; this requires some connection between the name and the integrity of the document it names. Additionally, it would be convenient for a naming scheme to have enough flexibility to allow authors to name their documents in a way that (1) reflects a structure or relationship between different documents or different parts of the same document or (2) includes other information that they deem useful about their documents.

Generally, schemes for naming digital documents may be classified into two different categories: (1) a name can be chosen according to an arbitrary convention of some sort or (2) a name may be chosen so that it functionally depends on the document it names—a functional dependence that is verifiable by other parties. An example of an arbitrary naming scheme is the International Standard Book Numbering (ISBN) system for published books. An example of a "verifiable" (or "self-attesting") naming scheme is one that assigns to any document its hash value by a specific one-way hash function (further explained below).

Arbitrary naming schemes vary according to how the scheme is established or enforced. The usual mechanism involves a choice that is made at a specific location (physical or logical). For example, a user's choice of a name for a new file created using a word-processing program on a personal computer is generally arbitrary and local: the user chooses the name on the personal computer according to his or her own convenience. The ISBN and the Library of Congress classification systems are also arbitrary; they depend on a non-local central naming scheme. Whenever the choice of a name is merely arbitrary, the correlation between the name and the object named is not intrinsically verifiable. In other words, there is no procedure by which a person can verify that a particular document is the same document that was assigned a particular name.

One way to guarantee that a digital document name is "verifiable" is to use a definite mathematical function taking bit-strings as arguments, and to use the value of the function, when it is evaluated on a particular document, as the "name" of that document. For convenience, the function should be easy to compute. In order that the names be unique, the function should also be computationally one-to-one. In addition, because of the desire that the name of a document should at the very least be shorter than the length of the document itself, the function should compress its arguments. Therefore, the usual choice for this sort of function is a one-way hash function.

A one-way hash function is an easily computed function that takes arbitrary-length bit-strings as input and produces fixed-length bit-strings as output ("hash values"). Such functions satisfy the following conditions: (1) it is infeasible to find two different inputs that produce the same hash value output and (2) given an input and its hash value output, it is infeasible to find a different input with the same hash value output. It is a consequence of these conditions that it is infeasible to recover any information about a file from its hash value.

The infeasibility of these computational tasks depends on the current state of the art, both the current state of mathematical (algorithmic) knowledge about attacking the function in question, as well as the computational speed and memory available in the best current computers. As the state of the art advances, it is possible that a function that was once securely one-way will eventually cease to be so. Currently, it is recommended that one-way hash functions produce outputs that are at least 128 bits long. For shorter outputs, the function is generally not secure (no matter what its design). As the current state of the art advances, the recommended length for secure hash functions increases.

While the scheme of naming a document by its one-way hash value is intrinsically verifiable, there are several inconvenient features associated with such a scheme. First of all, the names are too long for a human user to remember or even to communicate easily to another human being. Second, the author of a document has no control over the form of its name. With any one-way hash function, a document's hash value is simply a random-appearing bit-string of the appropriate length. Thus, inconvenient as it may be for the author, there will be no connection between the names of documents that are related to each other, either in form or in substance. Similarly, the name of a particular document gives no information regarding the underlying named document. Third, as technology advances, any particular choice of a function for a naming scheme becomes less secure, with the result that the name of a long-lived document will need to change over time if security is desired.

In light of the above, it would be desirable to be able to provide an improved digital time-stamping system.

It would also be desirable to be able to provide an improved method of working with digital documents.

It would further be desirable to be able to provide a system for assigning a name to a digital document wherein the name is user-friendly, concise, easy to refer to, intrinsically verifiable and able to provide information associated with the document named.

SUMMARY OF THE INVENTION

It is an object of this invention to provide an improved digital time-stamping system.

It is also an object of this invention to provide an improved method of working with digital documents.

It is a further object of this invention to provide a system for assigning a name to a digital document wherein the name is user-friendly, concise, easy to refer to, intrinsically verifiable and able to provide information associated with the document named.

In accordance with the present invention there is provided a method of time-stamping a digital document. The method includes the steps of: (a) receiving a first request for registering a first document; (b) receiving, combining and hashing other requests to form a repository of a plurality of hash values dependent upon a plurality of requests; (c) generating a location pointer for said first document in said repository; (d) naming said first document by said location pointer to provide a first name for said first document; and (e) generating a certificate for said first document including said first name. In accordance with the invention, not only can the certificate be used to self-authenticate a document at a later date, but the name in the certificate can be used to uniquely and conveniently refer to the time-stamped document. This method allows the time-stamping system to be used simultaneously as a naming system without the need for separate or parallel hardware to be maintained by a service bureau or a user for such additional convenience.

In addition to providing a method for simultaneously time-stamping and naming a digital document, the present invention also includes a method for naming a digital document. The method includes the steps of: (a) receiving a first request for naming a first document; (b) receiving, combining and hashing other requests to form a repository of a plurality of hash values dependent upon a plurality of requests; (c) generating a location pointer for said first document in said repository; and (d) naming said first document by said location pointer to provide a self-verifying name for said first document. This aspect of the invention provides a name for the digital document that is not only intrinsically verifiable, but is concise and easy to use as well. Additionally, the name is able to provide information associated with the document named. An added benefit of this aspect of the invention is that no new additional hardware over that used for the time-stamping of digital documents is required.

BRIEF DESCRIPTION OF THE DRAWINGS

The above and other objects and advantages of the invention will be apparent upon consideration of the following detailed description, taken in conjunction with the accompanying drawings, in which like-reference numerals refer to like-parts throughout, and in which.

DETAILED DESCRIPTION OF THE INVENTION

Figure 1:
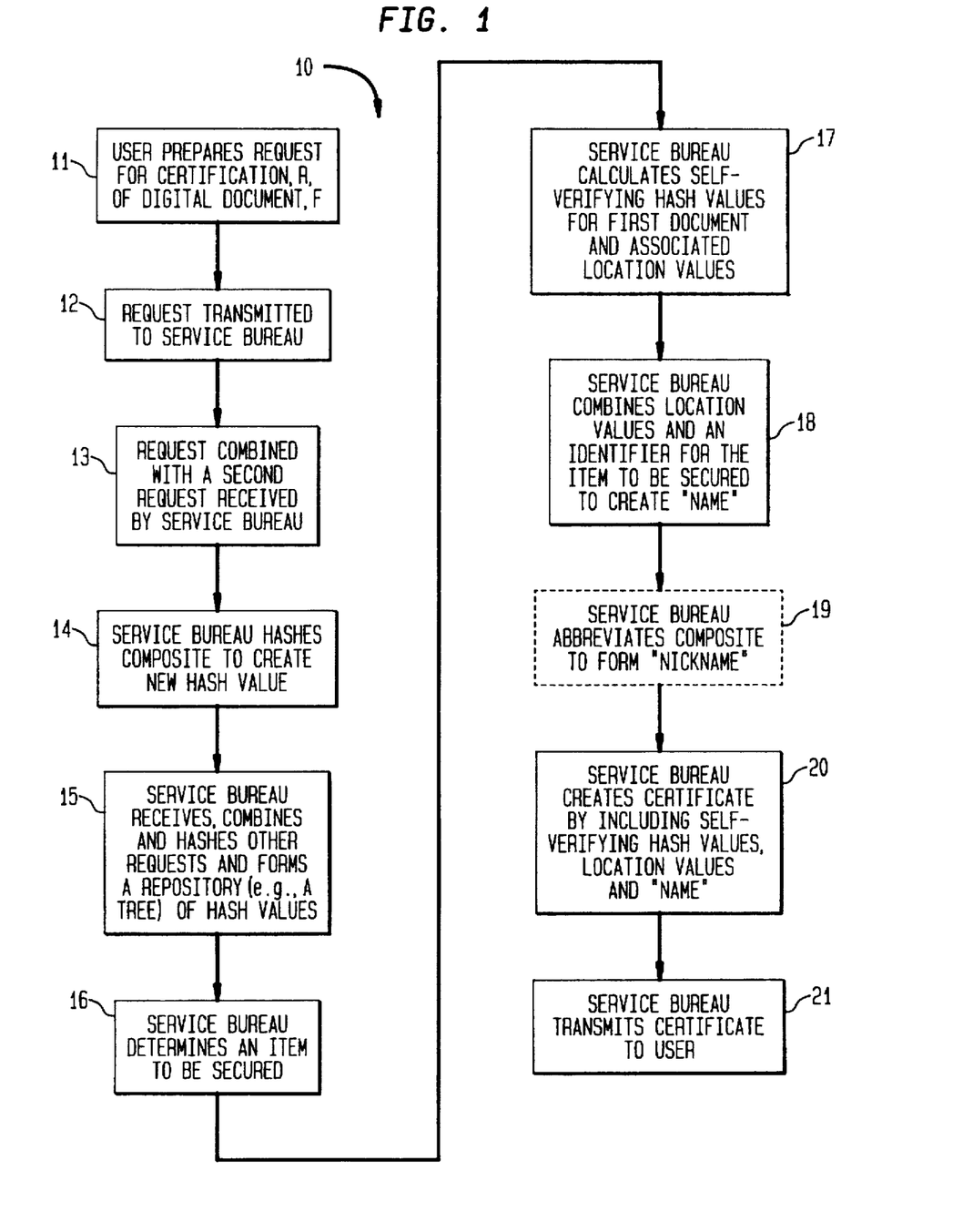
FIG. 1 is a flow diagram of an embodiment of the time-stamping process according to the invention.
Figure 2A:
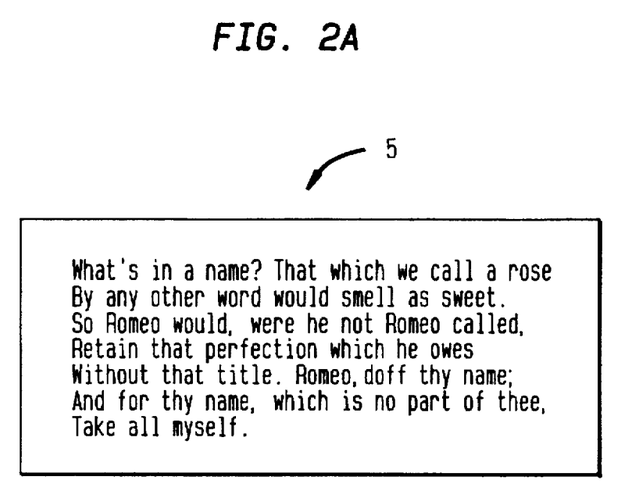
FIG. 2A is an illustrative alphanumeric representation of a digital document F for certification.

FIG. 1 is a flow diagram of a first embodiment of the time-stamping process according to the invention and will be described below in connection with FIGS. 2–4 which illustrate various features of the invention. As shown in FIG. 1, the present time-stamping procedure 10 begins at step 11 where a user prepares a request for certification, R, of a digital document, F. An example of an alphanumeric representation 5 of such a digital document F is shown in FIG. 2A. Digital document F may be in the digital form or representation of any alphanumeric text (illustrated in FIG. 2A) or video, audio, pictorial or other form of fixed data (not shown). Although the present process may be used with documents of any length, the excerpt of FIG. 2A is amply representative of a document for which time-stamping is desired.

Figure 2B:
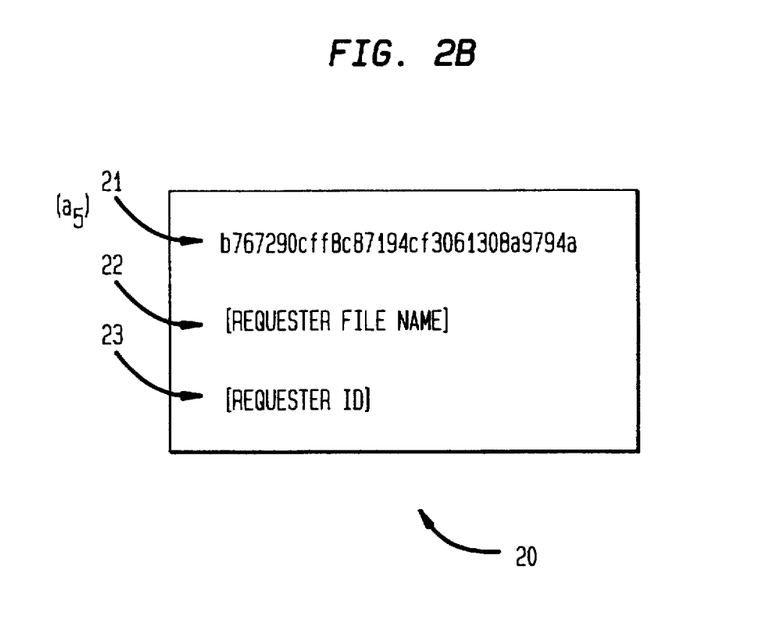
FIG. 2B is a diagram of an illustrative time-stamping request for providing a certificate according to the invention for document F of FIG. 2A.

In accordance with the present invention, FIG. 2B is a diagram of an illustrative alphanumeric representation of a time-stamping request R (prepared by the requester at step 11 of FIG. 1) for providing a certificate for document F (FIG. 2A). Request R includes hash value 21 ($a_5$) of document F shown in FIG. 2A, requester's file name 22 and requester's identification number 23. For convenience in the presentation of this example, hash value 21 ($a_5$) is computed using the 128-bit format of the MD5 one-way hashing algorithm (described by R. L. Rivest in "The MD5 Message-Digest Algorithm," Request for Comments (RFC) 1321, Internet Activities Board, April, 1992) and expressed in base sixteen (16). Of course, other one-way hashing algorithms could be used as well (for example, the MD4 algorithm or the National Institute of Standards and Technology's Secure Hash Algorithm [SHA] specified in Federal Information Processing Standard [FIPS] PUB 180). It should be noted that the alphanumeric and other numerical value representations used in this example are not in such form crucial to the implementation of the invention. That is to say, other representations could be used as well.

As shown in FIG. 2B, requester's file name 22 is used to allow the requester to identify the particular file that is the subject matter of the request. Generally, it has no significance to a service bureau's certification of the user's document and is optional to the request R. Requester's identification number 23 is used to allow the service bureau to identify the particular requester who has requested the certification of a document.

Referring back to FIG. 1, after a user prepares a request for certification R of a digital document F (FIG. 2A) at step 11, the user transmits request 20 (FIG. 2B) to the service bureau at step 12. At step 13, the service bureau combines requests. By doing so the service bureau takes from R hash value $a_5$ (FIG. 2B) of document F and combines (e.g., concatenates) that value with the hash value $a_6$ of a second document which is the subject matter of a second request for certification. At step 14, the service bureau hashes the composite to create a new hash value linked to hash values $a_5$ and $a_6$ by a one-way hash function. This aspect of the present invention is illustrated by FIG. 3 and the Table (appended below before the claims) which are, respectively, a diagram of a portion of an illustrative authentication and naming repository (e.g., binary tree) in accordance with the principles of the present invention and a table illustrating exemplary MD5 hash values for the repository of FIG. 3 when document F comprises the text of FIG. 2A. As illustrated in FIG. 3, digital document F is the subject matter of a request for certification R which, in turn, includes hash value $a_5$. As shown in the Table below (Subtree A), $a_5$ (for document F of FIG. 2A) has a value "b767290cff8c87194cf3061308a9794a". (For purposes of this illustrative example, hash values $a_1$–$a_4$, $a_6$–$a_8$, $b_1$–$b_8$, $d_1$, $d_3$–$d_6$ and $d_8$ in the Table have been assigned arbitrary values.)

Figure 3:
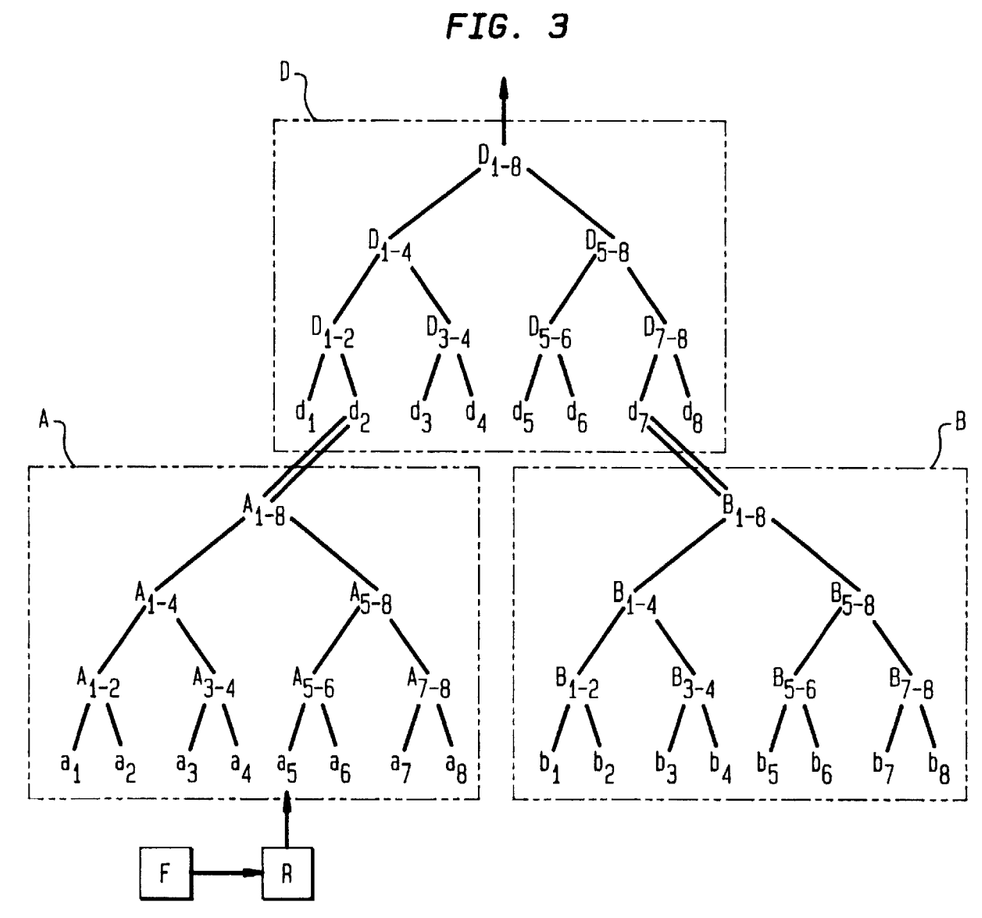
FIG. 3 is a diagram of a portion of an illustrative binary-tree authentication and naming repository.
Figure 4:
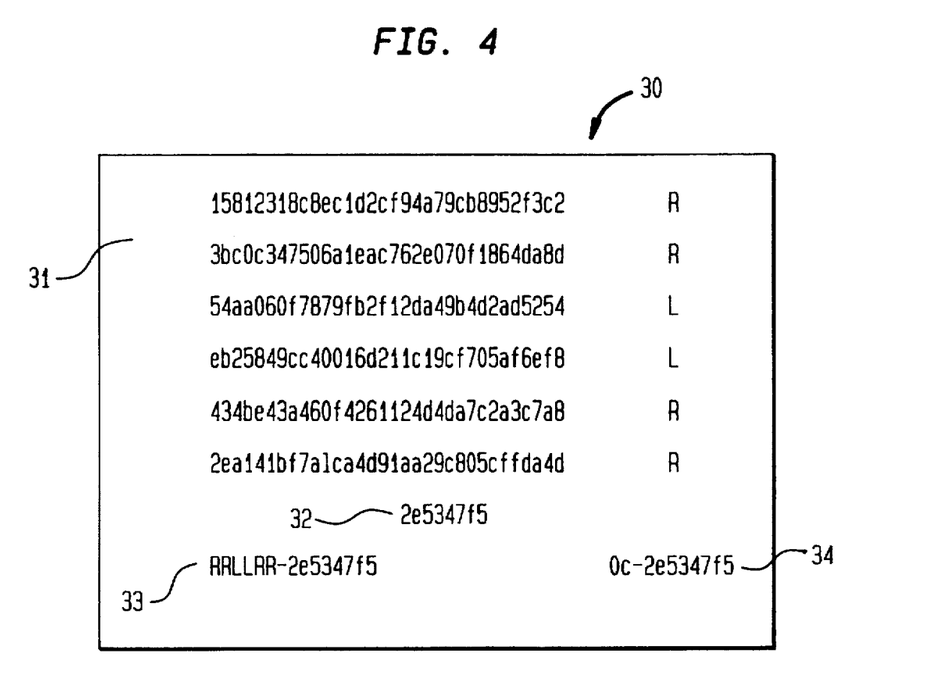
FIG. 4 is a diagram of an illustrative authentication certificate for uniquely naming document F of FIG. 2A in connection with the repository of FIG. 3.

At steps 13 and 14 of FIG. 1, hash value $a_5$ would be combined (e.g., concatenated) with hash value $a_6$ and the composite would be hashed to provide a new hash value represented in FIG. 3 by $A_{5-6}$ (wherein the subscript "5–6" represents that the resulting hash value is derived from the fifth and sixth leaves of subtree A). In other words, the first bit-string $a_5$ is combined with the second bit-string $a_6$ and the result is hashed to form a new bit-string $A_{5-6}$. (For example, in connection with FIG. 3 and the Table, the concatenation of $a_5$ and $a_6$ is "b767290cff8c87194-cf3061308a9794a15812318c8ec1d2cf94a79cb8952f3c2" while its hash value is "9dad90bbef28047744a26865acbf24ee".) At step 15 in FIG. 1, the service bureau continues to receive, combine and hash other requests for certification and forms a repository (for example, in FIG. 3, a tree) of resulting hash values (as illustrated in FIG. 3). In particular, as illustrated in FIG. 3, hash values $a_7$ and $a_8$ are combined and hashed to form a resulting hash value $A_{7-8}$. Thereafter, hash values $A_{5-6}$ and $A_{7-8}$ and are combined and hashed to form resulting hash value $A_{5-8}$. Similarly, hash values $a_1$, $a_2$, $a_3$ and $a_4$ are appropriately combined and hashed together to form $A_{1-2}$ and $A_{3-4}$ which, in turn, are combined together and then hashed to form hash value $A_{1-4}$. Then, subtree A is "closed off" by combining $A_{1-4}$ and $A_{5-8}$ together wherein the composite is then hashed to form hash value $A_{1-8}$ (wherein the subscript "1–8" represents that the resulting hash value is derived from the first through eighth leaves of subtree A). In other words, the documents represented by hash values $a_1$ through $a_8$ are linked together in subtree A, which forms a repository for those hash values. The elements of this repository are, in turn, linked together via the hash values $A_{i-j}$.

Referring to FIG. 3, the service bureau can continue to receive additional requests including document hash values $b_1$, $b_2$, $b_3$, $b_4$, $b_5$, $b_6$, $b_7$ and $b_8$ which are used to form a subtree B with a root $B_{1-8}$. As the service bureau continues to receive additional requests including document hash values $d_1$, $d_3$, $d_4$, $d_5$, $d_6$ and $d_8$, these hash values are combined with hash values $d_2$ and $d_7$ (which are respectively derived from roots $A_{1-8}$ and $B_{1-8}$) to form a final tree D comprised of hash values $D_{1-2}$, $D_{3-4}$, $D_{5-6}$ and $D_{7-8}$ and, in turn, $D_{1-4}$ and $D_{5-8}$. $D_{1-4}$ and $D_{5-8}$ are then combined together with the composite being hashed to form the root of tree D, hash value $D_{1-8}$.

Referring back to FIG. 1, step 16 of process 10 involves determining an item to be secured. (For example, in FIG. 3, subtrees A, B and D are closed off while root $D_{1-8}$ is the item to be secured.) As discussed below, at a later time before authentication, the item to be secured is secured by either (1) causing the item to be secured to be directly published (i.e., widely witnessed and widely available) or (2) linking the item to be secured to another hash value that is directly published. At step 17, with respect to request for certification R, the service bureau calculates the "self-verifying" hash values, defined as those hash values necessary to authenticate document F with respect to the secured item $D_{1-8}$: $a_6$, $A_{7-8}$, $A_{1-4}$, $d_1$, $D_{3-4}$ and $D_{5-8}$. Step 17 also involves calculating the location values (e.g., in FIG. 3, the "handedness" values) of the self-verifying hash values for $a_6$, $A_{7-8}$, $A_{1-4}$, $d_1$, $D_{3-4}$ and $D_{5-8}$: R, R, L, L, R and R, respectively. (As used herein, "L" refers to left and "R" refers to right).

With this list of hash values and their associated location values (which can be obtained, for example, from an authentication certificate as explained below), if at a later date a party desires to prove the authenticity of a document F as that which was received and registered by the service bureau at the time that secured item $D_{1-8}$ was computed (i.e., that F is the same as F'), the following steps would be performed. First, the hash of document F' would be combined on the right with self-verifying hash value $a_6$ and the composite would be hashed to form $A'_{5-6}$. Second, hash value $A'_{5-6}$ would be combined on the right with self-verifying hash value $A_{7-8}$ and the composite would be hashed to form $A'_{5-8}$. Third, hash value $A'_{5-8}$ would be combined on the left with self-verifying hash value $A_{1-4}$ and the composite would be hashed to form $A'_{1-8}$. Fourth, hash value $A'_{1-8}$ would be combined on the left with self-verifying hash value $d_1$, and the composite would be hashed to form $D'_{1-2}$. Fifth, hash value $D'_{1-2}$ would be combined on the right with self-verifying hash value $D_{3-4}$ and the composite would be hashed to form $D'_{1-4}$. Sixth, hash value $D'_{1-4}$ would be combined on the right with self-verifying hash value $D_{5-8}$ and the composite would be hashed to form $D'_{1-8}$. Accordingly, if the alleged document F' is authentic, then $D'_{1-8}$ would yield the correct hash value $D_{1-8}$ (i.e., $D'_{1-8} = D_{1-8}$) as obtained from published or secured records (e.g., from any one of a variety of sites that store validation records). Otherwise, a revised document would hash to a different value.

Another feature of the digital time-stamping system of the present invention is that it facilitates quick registration of a document without the need for quick publication for validation purposes. In other words, certificates can be provided even though publication may not take place at the given point in time when the certificate is generated and transmitted to the requester. The only requirement is that some type of publication event occur prior to the time a user desires to validate a (document, certificate) pair. For example, referring to FIG. 3, hash value $D_{1-8}$ does not necessarily have to be "published" at the time of registration of the documents represented by hash values $a_1$ through $a_8$, as long as it is eventually secured (i.e., it is directly published or securely linked to a hash value that is). In contrast to other time-stamping methods, this feature of the present invention allows for quick response time to requests for registration without requiring a correspondingly quick publication time. By decoupling the registration-request process from the publication process, the time-stamping system is better adapted to handle larger volumes of registration requests (that are expeditiously fulfilled) without burdening the service bureau repository manager with the need for expensively frequent publication.

Referring back to FIG. 1, the process continues to step 18 where the service bureau combines location values (e.g., handedness) and the identifier for the item to be secured (e.g., root) $D_{1-8}$ to form a composite "RRLLRR|$D_{1-8}$Identifier|". In accordance with a feature of the present invention, this combination (e.g., concatenation) can be used as a "name" for document F which not only is short and concise, but is unique and self-authenticating as well. For example, there is only one document in the world which can have the name "RRLLRR |$D_{1-8}$Identifier|". This name is much shorter than the length of a typical useful hash value which generally is 128 bits or longer in length. Moreover, use of the name in conjunction with the hash values it inherently refers to can be used to verify that the particular document it refers to is authentic.

In accordance with the present invention, the process continues to optional step 19 where the unique name generated by step 18 can be further abbreviated to form an even shorter "nickname." For example, the name "RRLLRR|$D_{1-8}$Identifier|" can be represented in an alphanumeric format by first converting to a base two representation, e.g., "001100[$D_{1-8}$Identifier in base 2]", and then to an alphanumeric representation. This "nickname" feature of the present invention is particularly adapted to allow a person to quickly jot down the name of a time-stamped document when that document is referred to over the telephone, for example. In particular, document F, which could have a hash value comprised of 128 or more bits, for example, would have a "nickname" in accordance with the present invention of less than about ten characters or the length of a long distance telephone number in the United States.

Referring to FIG. 1, the process continues to step 20 where the service bureau creates an authentication certificate for document F by including the self-verifying hash values, location (e.g., handedness) values for those hash values and the unique name or nickname for document F. FIG. 4 is a diagram of an illustrative authentication certificate 30 for document F of FIG. 2A in connection with the repository of FIG. 3 wherein the hash values of subtrees A, B and D take on the values set forth in the Table below. Certificate 30 includes four types of information: (i) self-verifying hash values with associated handedness values 31, (ii) a pointer 32 to the root $D_{1-8}$ (for example, in FIG. 4, pointer 32—2e5347f5—is an illustrative unique identifier for root $D_{1-8}$ in an alphanumeric base and, as discussed below, represents the time when root $D_{1-8}$ was computed, (iii) document F's unique name 33 and (iv) document F's unique nickname 34. If desired, certificate 30 could include the information from request 20 of FIG. 2B. Additionally, name 33 could be left off the certificate to simplify its look. Process 10 of FIG. 1 then continues to step 21 where certificate 30 is transmitted by the service bureau back to the user.

Thus, FIGS. 1–4 illustrate an embodiment of the present invention wherein a document F is time-stamped and an authentication certificate is provided which not only can be used to verify the authenticity of an alleged document F' at a later date, but can be used to uniquely refer to document F in a quick and easy manner. This additional "naming" feature of the time-stamping system of the present invention does not require additional or parallel hardware, by the service bureau or the user, for providing the extra convenience of "naming" to its users.

Figure 5:
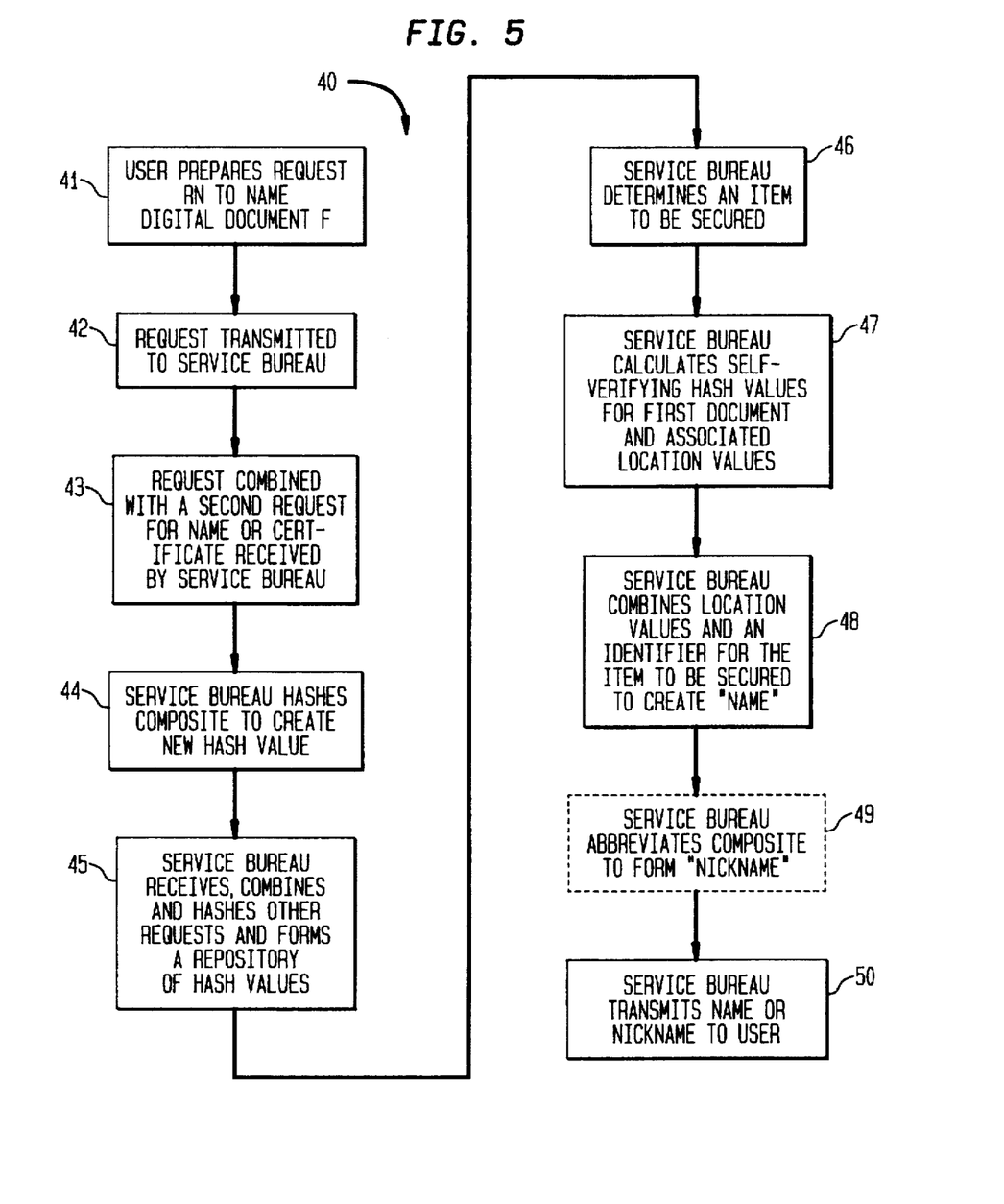
FIG. 5 is a flow diagram of another embodiment of the process according to the invention for uniquely naming a document.

In accordance with another aspect of the present invention, the process of the invention could be used to provide a unique and self-verifying "name" for a document without the need to be accompanied by a certificate including the document's self-verifying hash values. This feature of the present invention is illustrated by FIG. 5, which is a flow diagram of another embodiment of the process according to the invention. Process 40 begins at step 41 where a user prepares a request RN to name a digital document F. For example, the request RN could include the information present on time-stamping request R of FIG. 2B. Process 40 then continues to step 42 where the requester transmits the request to the service bureau. At step 43, the service bureau combines (e.g., concatenates) requests. By doing so, the service bureau takes the hash value of the subject document and combines (e.g., concatenates) that value with the hash value of a second document which is the subject matter of a second request to name similar to FIG. 1 above. In an alternative, the second request could be that of a request to provide a time-stamp certificate using the same service bureau system. From the standpoint of the service bureau, the type of request is generally not important.

At step 44, the service bureau hashes the composite to create a new hash value as in FIG. 1 above. At step 45, the service bureau continues to receive, combine and hash other requests for names (or certification) and forms a repository (e.g., a tree) of resulting, linked hash values (similar to FIG. 3). At step 46 the service bureau identifies an item to be secured (e.g., the root $D_{1-8}$). As discussed in FIG. 1 above, at a later time before authentication, the item to be secured is secured by either (1) causing the item to be secured to be directly published (i.e., widely witnessed and widely available) or (2) linking the item to be secured to another hash value that is directly published. At step 47, with respect to request to name RN, the service bureau calculates the "self-verifying" hash values and the location values (e.g., "handedness") of the self-verifying hash values for the subject document similar to step 17 of FIG. 1. At step 48, the service bureau combines location values and an identifier for root $D_{1-8}$ to form a composite similar to FIG. 1. At optional step 49, the unique name generated by step 48 can be further abbreviated to form an even shorter "nickname" similar to FIG. 1.

Figure 6A:
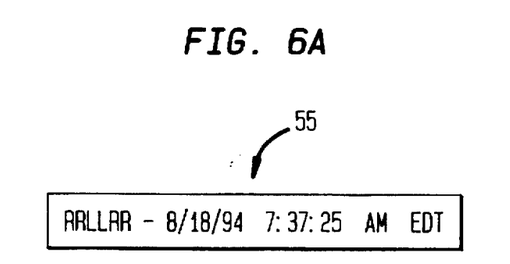
FIGS. 6A–6C are diagrams illustrating first, second and third embodiments, respectively, of the name of document F of FIG. 2A according to the process of FIG. 5.
Figure 6B:
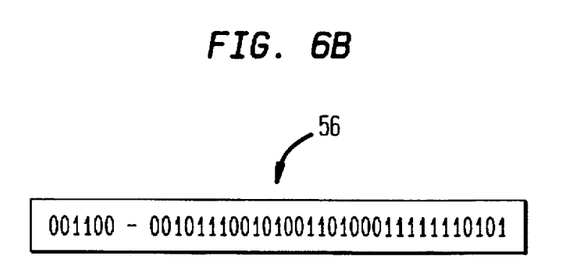
Figure 6C:
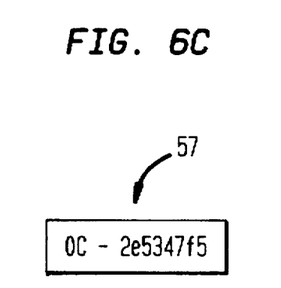

The process then continues to step 50 where the service bureau transmits the "name" back to the requester. In accordance with the present invention, FIGS. 6A–6C illustrate first, second and third embodiments, respectively, of illustrative names according to process 40 of FIG. 5. As shown in FIG. 6A, name 55 comprises the combination (e.g., concatenation) of location values (e.g., handedness values) with a root identifier (e.g., a root identifier by the time it was published: "Aug. 18, 1994 7:37:25 AM EDT"). In FIG. 6B, name 55 of FIG. 6A is expressed in a base two representation 56 using an equivalent time (e.g., in UNIX standard time: the number of seconds since the first second of 1970 in Greenwich Mean Time). In FIG. 6C, name 56 of FIG. 6B is further simplified by expression in an alphanumeric format 57. Of course, although "time" was used as the root identifier in FIGS. 6A–6C, other unique identifiers could be used as well. For example, a sequential root publication number could also be used, i.e., the number of roots that were published since a given publication. Such a sequential root publication number uniquely identifies a root just as well as the time at which a root is published.

After a name N is computed for a particular document F, if at a later date a party desires to authenticate the connection between the name N and a document-at-issue F', the party would need to obtain a copy of the authentication certificate C (from a storage facility or other means) and then proceed as follows. First, the party would verify that N was correctly extracted from the information contained in C. Next, the party would proceed with the validation procedure discussed above in connection with FIG. 1.

Thus, in accordance with the process of FIG. 5, a name or nickname is provided for a digital document which is not only intrinsically verifiable but is short and simple and can be referred to or written down quickly. For example, as shown in FIG. 6C, the process of FIG. 5 can provide a name having less than about forty (40) bits (i.e., less than about ten hexadecimal digits) even though the document it is referring to has a typical hash value of at least 128 bits. (However, there are more compact alphanumeric encodings of bit-strings than the hexadecimal representation. For example, UUCP printable-character encoding employs six bits rather than four bits per alphanumeric character. In such encoding, the name illustrated in FIG. 6C would be only seven characters long—the length of a local telephone number in the United States.) Moreover, the "name" of the document is unique. In other words, no other document named by the system employing the method of FIG. 5 will have the same "name." This is inherently guaranteed by the method of the present invention. Moreover, the hardware to provide the name can also be used to time-stamp digital documents.

Although the invention has been described above with reference to FIG. 3 wherein a "binary" tree has been illustrated as the repository for linking and securing hash values, there are many other ways of implementing the invention. For example, the "repository" of the present invention may be a ternary, quaternary, or k-ary tree, or any combination thereof, instead of a binary tree. Of course, although FIG. 3 illustrates three subtrees A, B and D, each including eight leaves, other tree and subtree arrangements or combinations could be used as well. The only constraint is that the items in the repository be linked via a hash function which allows the repository to be secured by a publication event. In mathematical terms, it suffices that the items in the repository form a growing directed acyclic graph in which occasionally there is an item to which every item in the graph can be linked by a directed path.

Figure 7:
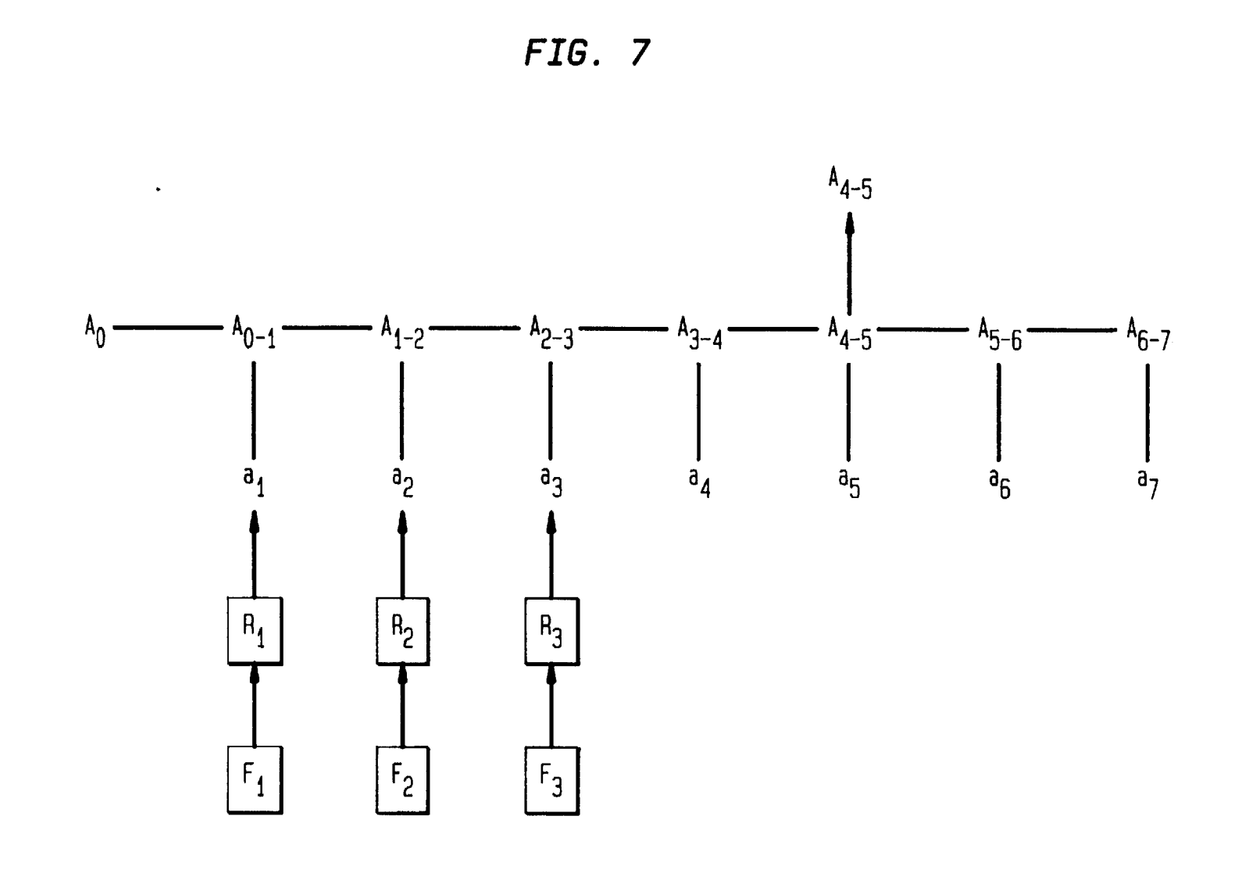
FIG. 7 is a diagram of a portion of an illustrative linear-linked-list authentication and naming repository.

Accordingly, linear linked lists or other types of accumulations of hash values may be used as well. For example, linear linked lists such as those described in "How to Time-Stamp a Digital Document," by S. Haber and W. S. Stornetta, Journal of Cryptography, Vol. 3, No. 2, pp. 99–111 (1991) may be used instead. This is illustrated by FIG. 7 which is a diagram of a portion of an illustrative linear linked list for implementing the naming process of the present invention. As shown in FIG. 7, requests to name $R_1$, $R_2$ and $R_3$ are associated with digital documents $F_1$, $F_2$ and $F_3$, respectively. Requests $R_1$, $R_2$ and $R_3$ can be similar to those discussed above in connection with FIG. 2B. These requests are transmitted to the service bureau where the service bureau, in turn, takes the document hash value $a_1$ of document $F_1$ and combines it with a pre-existing hash value $A_o$ and then hashes the composite to provide a new linking hash value $A_{o-1}$. This new linking hash value $A_{o-1}$ is then combined with the document hash value $a_2$, associated with document $F_2$, and the composite is hashed to provide a new linking hash value $A_{1-2}$. Similarly, the new linking hash value $A_{1-2}$ is then combined with document hash value $a_3$, associated with document $F_3$, and the composite is hashed to provide a new linking hash value $A_{3-4}$.

This process continues for as long as desired to form an accumulation or repository of linked hash values for securing the integrity of a corresponding accumulation of underlying digital documents. Periodically the service bureau secures the repository by publishing a portion of the repository (for example, in FIG. 7, linking hash value $A_{4-5}$) so that a requester can use a certificate including a unique "name." Similar to FIGS. 1–6, the "name" is derived from a combination of a representation of a first location pointer to the "published" linking hash value (e.g., a pointer to linking hash value $A_{4-5}$) with a representation of a second pointer from the particular document to be named within the repository to the "published" linking hash value. For the linear linked list of FIG. 7, such a second pointer could simply be an integer count of the number of linking hash values between the "published" linking hash value and the hash value of the document to be named. For example, for documents $F_1$, $F_2$ and $F_3$ of FIG. 7, this number could be 4, 3 and 2, respectively. As a result, the "names" for documents $F_1$, $F_2$ and $F_3$, for this particular embodiment, could be: "4|location pointer to linking hash value $A_{4-5}$|"; "3|location pointer to linking hash value $A_{4-5}$|"; and "2|location pointer to linking hash value $A_{4-5}$|". In accordance with the invention, such names are not only short, concise and unique, but self-verifying as well.

In accordance with the present invention, other methods of linking hash values can also be used. For example, roots of frequently-computed trees (e.g., every second or minute) can be combined into daily trees whose roots can be combined into linear linked lists.

In summary, the present invention includes a method for naming a digital document that retains the verifiable security of naming documents solely by their hash values, while avoiding many of the constraints listed above in connection with naming documents in this way. The essence of this aspect of the present invention is to keep a repository of hash values that depend on many digital documents, and to name each document by a concise description of a location in the repository to which the name can be "linked".

In a preferred embodiment of the invention, bit-strings are "linked" by the use of one-way hash functions. By systematically invoking a hash function on pairs or ordered lists of hash values, new hash values are computed from old ones so as to form linked lists, binary trees, or other combinatorial structures. In this way, documents are linked to the repository, and the elements of the repository are linked to each other.

The repository is secured by making portions of it widely witnessed and widely available by any of various means. Other portions of the repository—and any document that has been registered—are secured by linking such portions and documents to the widely available portions.

No matter what the exact form of the combinatorial structure formed by the growing pattern (i.e., the directed acyclic graph) of hash values, a list of hash values and accompanying (very concise) structural "driving directions" or location information is used to link a particular digital document with a summarizing widely available hash value in the repository. This list of hash values and location information can be placed in an authenticating certificate for the document. Only an exact copy of the registered document can be linked with this certificate and location in the repository. This is due to the properties of the one-way hash function, and to the widely witnessed and widely available nature of the repository records.

Accordingly, a document that has such an authenticating certificate is given as a name a concise encoding of the relevant location information. No other (document, certificate) pair can be computed that "has this name."

In accordance with the present invention, the naming method can be embodied in different ways. Different combinatorial structures can be combined in different ways, with different levels of wide witnessing. For example, there can be a direct link to the widely-witnessed fabric of the repository. In particular, all records kept by a repository manager can be publicized and location information can be as simple as a direct pointer. In an alternative, there could be local trees (or lists) where a user builds his or her own trees (or other structures) (e.g., subtrees "A" and "B" in FIG. 3) whose roots are regularly sent to the repository manager for linking to the widely witnessed part of the repository records.

In certain implementations of the invention, this naming method allows a user a fair measure of personal control and choice over the names of his or her documents. Consider, for example, a local-tree implementation, for which the location information for a particular document may be written as a position in a local tree followed by a position in a service bureau's tree. A user can name a multi-part document by placing each successive part at consecutive leaf nodes of an appropriate local tree (or other structure). For example, in FIG. 3, the eight hash values $a_1$ through $a_8$ could represent eight chapters in a book. Thus, such consecutive parts of the document have consecutive local positions in the local tree (or structure). Thereafter, when a local repository manager forwards the root of such local tree to a service bureau repository manager, the resulting registration information gives such consecutive parts of the document consecutive names under an appropriate encoding of local information. An example of an appropriate encoding is by simple sequential numbering of the leaves. Furthermore, the non-local portions of these names are identical, explicitly encoding the fact that they are part of the same document. For example, with reference to FIG. 3 and the Table below, where hash values $a_1$ through $a_8$ represent consecutive parts of a multi-part document and "3e5347f5" is an identifier for root $D_{1-8}$, the "names" of the documents represented by hash values $a_1$ through $a_8$ could be as follows: $a_1$: "1-LRR-2e5347f5"; $a_2$: "2-LRR-2e5347f5"; $a_3$: "3-LRR-2e5347f5"; $a_4$: "4-LRR-2e5347f5"; $a_5$: "5-LRR-2e5347f5"; $a_6$: "6-LRR-2e5347f5"; $a_7$: "7-LRR-2e5347f5"; and $a_8$: "8-LRR-2e5347f5".

More complicated ways of structuring the parts of a document can similarly be encoded in the self-attesting names assigned by the naming method of the present invention. For example, in FIG. 3, $d_1$ through $d_8$ could represent eight individual chapters in a book wherein the chapters represented by $d_2$ and $d_7$ could each, in turn, have eight sections represented by hash values $a_1$ through $a_8$, and $b_1$ through $b_8$, respectively. Accordingly, under such circumstances, the "names" of the various parts of the document represented by hash values $a_i$, $b_j$ and $d_k$ in FIG. 3, for example, could be as follows if hash value $D_{1-8}$ is sent to the service bureau repository manager and the local repository manager receives, in return, the name N: $a_1$: "1-2-N"; $a_2$: "2-2-N"; $a_3$: "3-2-N"; $a_4$: "4-2-N"; $a_5$: "5-2-N"; $a_6$: "6-2-N"; $a_7$: "7-2-N"; $a_8$: "8-2-N"; $b_1$: "1-7-N"; $b_2$: "2-7-N"; $b_3$: "3-7-N"; $b_4$: "4-7-N"; $b_5$: "5-7-N"; $b_6$: "6-7-N"; $b_7$: "7-7-N"; $b_8$: "8-7-N"; $d_1$: "1-N"; $d_2$: "2-N"; $d_3$: "3-N"; $d_4$: "4-N"; $d_5$: "5-N"; $d_6$: "6-N"; $d_7$: "7-N"; and $d_8$: "8-N".

In another implementation, a table of contents for a long or complicated multi-part document can be included in a standard place in the request. For example, in FIG. 3, $d_8$ could represent a table of contents document for a seven-chapter book represented by $d_1$(chapter 1) through $d_7$(chapter 7) wherein the chapters represented by $d_2$ and $d_7$ could each, in turn, have eight sections represented by hash values $a_1$(section 1) through $a_8$(section 8), and $b_1$(section 1) through $b_8$(section 8), respectively. A feature of this aspect of the present invention is that a single self-verifiable document of the multi-part document (i.e., the table of contents) contains a description of all the parts of the document, allowing that single document to be used to list those parts of the document that may relate to a particular topic. At a later time, together with a collection of documents to be authenticated and their alleged certificates, such an authenticated list can be used to verify that (1) each of such documents is an exact copy of a respective document that was registered with the table of contents and (2) none of the documents on such list are missing.

This method for using names to encode document organization is only one of several different ways in which the self-attesting names of the present invention can be meaningful to human readers and users of digital documents. For example, one convenient way to encode the location in the repository to which a document is linked is by the date and time—something that is easily comprehensible. See FIG. 6A, for example.

Another way to make the system's names more meaningful and useful to users would allow users to have "personalized" naming requests as follows. Suppose that the service bureau's repository records are formatted in a standard way every day (e.g., by closing off a binary tree once every minute), and let F( ) denote a standard mapping from ASCII-encoded strings to the list of daily repository-record locations (e.g., to the minutes of the day). A personalized naming request is accompanied by an ASCII-encoded string of characters, e.g., "ABC Corp." or "John Smith's Ph.D. Dissertation". Each day's personalized naming requests are then linked by the repository manager to the location named by evaluating F( ) on the ASCII-encoded string provided, for example, by linking the request to the tree rooted at the minute given by F("ABC Corp.") or F("John Smith's Ph.D. Dissertation"). In this way the requester's personalized choice of character string—any information that the requester deems to be useful about the document—can be made to be part of the self-attesting name of the document named. Of course, a similar technique could be adapted at other time scales, for example, every hour instead of every minute.

Additionally, the method described in co-pending U.S. patent application Ser. No. 07/992,883, filed Dec. 21, 1992 now U.S. Pat. No. 5,373,561, incorporated herein by reference in its entirety (as well as in "Improving the Efficiency and Reliability of Digital Time-Stamping", D. Bayer, S. Haber and W. S. Stornetta, in Sequences II: Methods in Communication, Security, and Computer Science, eds. R. M. Capocelli, A. DeSantis, U. Vaccaro, pp. 329–334, Springer-Verlag, New York, 1993), for renewing cryptographic certificates of authenticity applies directly to the certificates of the present naming method. Therefore, as long as the certificates are appropriately renewed as technology advances, the self-attesting names assigned by the present method have long-term validity without any need to change them.

In summary, this aspect of the present invention is an improvement over conventional naming methods because the names assigned herein are self-attesting a universally verifiable manner (even if the naming procedure is primarily a local operation). This aspect of the present invention is also an improvement over current document-intrinsic naming methods because the names assigned by this method are short, meaningful, flexible, renewable (and thus secure for the long term) and provide information chosen by the requester to associate with the document named. Furthermore, the naming system is scaleable to handle very large volumes of naming requests.

One skilled in the art will appreciate that the present invention can be practiced by other than the described embodiments, which are presented here for purposes of illustration and not of limitation, and that the present invention is limited only by the claims that follow.

TABLE

| Item | Hash Value |
|---|---|
| SUBTREE A | |
| $A_{1-8}$ | f5494db92e6c8483b9bdaa4bf178c303 |
| $A_{1-4}$ | 54aa060f7879fb2f12da49b4d2ad5254 |
| $A_{1-2}$ | 4479b9a001f14169711491324642eb3b |
| $a_1$ | 48625e69904312c4e039520d1dc393ed |
| $a_2$ | 7afbd85310f93c94877fa65a94bab14b |
| $A_{3-4}$ | 745499ea7fe4566ec79a1994464dee88 |
| $a_3$ | 264a9942be1305a52b9a9e63507e7777 |
| $a_4$ | b19f5a580a17d249b18feb8b3c132119 |
| $A_{5-8}$ | 09e41441b6251dc67064d9796d0b52f9 |
| $A_{5-6}$ | 9dad90bbef28047744a26865aacf24ee |
| $a_5$ | b767290cff8c87194cf3061308a9794a |
| $a_6$ | 15812318c8ec1d2cf94a79cb8952f3c2 |
| $A_{7-8}$ | b3c0c347506a1eac762e070f1864da8d |
| $a_7$ | 47bd88b2211be3acd7a109ae8a902bfb |
| $a_8$ | 58be9247a381d4b2b79745e919ccdb9d |

TABLE-continued

| Item | Hash Value |
|---|---|
| Subtree B | |
| $B_{1-8}$ | 45cef3b358ec01313e22cb2abfcf0299 |
| $B_{1-4}$ | 084839f914473dfe9aab074d3d3c82e0 |
| $B_{1-2}$ | 89849b2a43c86d12c4be34b81e1cb6c7 |
| $b_1$ | 497250ca00d69f681dd99bef275fcf06 |
| $b_2$ | 5c3e1dfl d74c7c804598cddd02e05dc6 |
| $B_{3-4}$ | 200f7492af69313e6331aaa0e9938647 |
| $b_3$ | 048be0b1a8f2a5dadf75f9d11b1df5c2 |
| $b_4$ | 937d8c5ec6f1085d8f89132a9b1508f8 |
| $B_{5-8}$ | 4f769ac152b7f12c8edecbc7ec9e9090 |
| $B_{5-6}$ | 87612a79a6968f7ba5c2a132c4fd4ccc |
| $b_5$ | 4506c79e16d3c26a065df1525e1f4eab |
| $b_6$ | 9ca9b5b4da971d7768bbb9e966560918 |
| $B_{7-8}$ | 36322496299c8dadd78f1a2473376b4d |
| $b_7$ | f82613590086558c180ef1196993eb4b |
| $b_8$ | 89979c5f999e300c12334ed1c40b26be |
| Subtree D | |
| $D_{1-8}$ | 8c0c0f081ece86263e0501986a276ee6 |
| $D_{1-4}$ | 89757d912c9e0d8395b9be398aab3c7c |
| $D_{1-2}$ | 95ff9e47d7a27c5385ae4d5b1d99efa1 |
| $d_1$ | eb25849cc40016d211c19cf705af6ef8 |
| $d_2$ | f5494db92e6c8483b9bdaa4bf178c303 |
| $D_{3-4}$ | 434be43a460f4261124d4da7c2a3c7a8 |
| $d_3$ | d18b443860ff0634514c9c45ea4bbbf0 |
| $d_4$ | 9dd05563eef31a9fae805d4e098145ec |
| $D_{5-8}$ | 2ea141bf7a1ca4d91aa29c805cffda4d |
| $D_{5-6}$ | 5f666477f7823ae4703bf00c798efbfa |
| $d_5$ | ecd8b30555ce9b6958844a2e2367b558 |
| $d_6$ | 9f79e3bb17368c5563840996f126628f |
| $D_{7-8}$ | af60dcf82629669b396f90e8b4e6434e |
| $d_7$ | 45cef3b358ec01313e22cb2abfcf0299 |
| $d_8$ | f4156627215420bfd7f79cdc24cc0f37 |

What is claimed is:

1. A method for processing a plurality of digital documents comprising the step of electronically generating a repository of hashed digital values in the form of a directed acyclic graph having nodes, each node comprising a hash value dependent on at least one of said digital documents, and the repository having a secured value comprising a hash value derived from more than one of said digital documents and generating a location pointer in the repository for one of the plurality of digital documents and naming said one digital document to provide a self-verifying name for said one digital document.

2. A certificate for a digital document, the certificate generated by processing a plurality of digital documents by electronically generating a repository of digital hash values in the form of a directed acyclic graph having nodes, wherein each of said nodes in the repository is determined by a hash value of at least one of said digital documents and generating a location pointer in the repository for one of the plurality of digital documents and naming said one digital document to provide a self-verifying name for said one digital document.

3. The certificate of claim 2, wherein the certificate authenticates the digital document.

4. The certificate of claim 2, wherein the certificate time-stamps the digital document.

5. A method for validating a first digital document purported to be a true copy of a previously registered second digital document, wherein the second digital document was registered by generating a certificate including a self-verifying name, self-verifying hash values for the second document, and associated location values for said self-verifying hash values wherein the self-verifying name comprises a combination of said location values and an identifier of a secure hash value, the method comprising the steps of:

(a) providing the secure hash value determined at least in part by the hash value of the second document;

(b) hashing the first digital document to provide a first digital document hash value;

(c) hashing and combining the first digital document hash value with said self-verifying hash values according to said location values; and (d) determining whether a resulting hash value from step (c) corresponds to the secure hash value.

6. The method of claim 5 wherein the step of combining comprises concatenating.

7. The method of claim 5 wherein the step of providing the secure hash value comprises either (1) publishing an item directly or (2) linking an item to another item that is published directly.

8. The method of claim 7 wherein said published hash value is published some time after the second document is registered.

9. The method of claim 5 further comprising the step of linking the secure hash value to another hash value that is directly published.

10. A method of registering a first digital document for authentication, comprising the steps of:

a. transmitting from an author to a service bureau, a first request for registering the first digital document, the first request including a representation of the first digital document;

b. receiving at the service bureau the first request for registering the first digital document;

c. receiving at the service bureau a plurality of other requests for registering other digital documents, each request including a representation of one of the plurality of other digital documents;

d. the service bureau combining the first request with at least one of the plurality of other requests to form a first value;

e. the service bureau hashing the first value to generate a first hash value;

f. the service bureau forming a repository of a plurality of hash values including said first hash value, the repository depending on the first request and the plurality of other requests;

g. securing the repository by publishing an item in the depository, the item determined at least in part by a request;

h. the service bureau generating a location pointer in the repository for the first digital document, and i. the service bureau providing a self-verifying name to the digital document by using the location pointer.

11. The method of claim 10 wherein the step of combining comprises concatenating.

12. The method of claim 10 wherein said repository is a tree and the step of publishing the item comprises publishing a root of said tree.

13. The method of claim 10 wherein said published item has an identifier comprising a user-friendly representation of the date or time at which the item was computed.

14. The method of claim 10 wherein a local entity also performs steps (b) and (c) to form a local repository having a local item to be secured and wherein the local entity subsequently sends a first request comprising said local item to the service bureau which performs step (b) through (i).

15. The method of claim 14 wherein steps (c), (d), and (e) are performed by said service bureau and further includes the step of combining said local item with another hash value.

16. The method of claim 14 further comprising the step of including in the local repository a hash value of a table of contents for a plurality of related documents.

17. The method of claim 14 further comprising the step of including in the local repository a plurality of items corresponding to a plurality of portions of a multi-part document.

18. The method of claim 10 wherein the repository is a binary tree.

19. The method of claim 10 wherein the repository is a linked list.

20. The method of claim 10 wherein the repository is a growing directed acyclic graph.

21. The method of claim 10 wherein the step of combining further comprises the step of combining roots of frequently computed trees to form less-frequently computed trees whose roots are in turn combined into linear linked lists.

22. The method of claim 10 wherein the step of generating the location pointer further comprises determining a list of self-verifying hash values for the first document and associated location values for said self-verifying hash values.

23. The method of claim 22, wherein the step of providing a self-verifying name further comprises naming said first document by an identifier of said published item and by said location values to provide the self-verifying name for said first document.

24. The method of claim 22 wherein said step of providing a self-verifying name for said first document further comprises applying a compact encoding algorithm to a combination of said associated location values and an identifier of said published item to provide a simplified alpha-numeric name for said first document.

25. The method of claim 10 wherein the step of providing a self-verifying name further includes the step of a requester choosing a first portion of said self-verifying name for certifying the first document.

26. The method of claim 25 wherein the step of choosing the first portion of the self verifying name further comprises choosing information associated with the first document.

27. The method of claim 25 wherein the first portion of the self-verifying name provides information about the requester for certifying the first document.

28. The method of claim 10, further comprising the step of the service bureau generating a certificate for said first digital document including the self verifying name.

29. The method of claim 28, further comprising the service bureau transmitting the certificate to the author.

30. The method of claim 28 wherein the step of generating the certificate further comprises the step of including on the certificate the list of self-verifying hash values.

31. The method of claim 28 wherein the step of generating the certificate occurs substantially prior to a time at which an item of the repository is published.

32. The method of claim 28 further comprising the step of transmitting the certificate to a storage facility and transmitting the self-verifying name to the originator of the first request.

33. The method of claim 10, wherein the step of receiving requests further comprises receiving requests from a plurality of users.

34. A certificate authenticating a digital representation of a document, said certificate generated according to the method of claim 10.

35. A method for naming a first digital document, comprising the steps of:

a. transmitting from an author to a service bureau a first request for naming the first digital document, the first request including a representation of the first digital document;

b. the service bureau receiving the first request;

c. receiving at the service bureau a plurality of other requests for naming digital documents, each request including a representation of one of the plurality of other digital documents;

d. the service bureau combining the first request with at least one of the plurality of requests to form a first value;

e. the service bureau hashing the first value to generate a first hash value;

f. the service bureau forming a repository of a plurality of hash values including said first hash value, the repository being in the form of a directed acyclic graph having nodes, each node comprising a hash value dependent on at least one of said requests, and said repository also having a secured item comprising a hash value dependent on a plurality of said requests;

g. the service bureau generating a location pointer in the repository for the first digital document; and h. the service bureau naming said first digital document using said location pointer to provide a self-verifying name for said first digital document.

36. The method of claim 35 wherein the step of combining comprises concatenating.

37. The method of claim 35 further including the step of securing the repository by publishing an item of the repository, the item determined at least in part by at least one request.

38. The method of claim 37 wherein the step of generating the location pointer further comprises determining a list of self-verifying hash values for the first document and associated location values for said self-verifying hash values.

39. The method of claim 38 wherein the step of naming further comprises naming said first document by an identifier of said published item and by said location values to provide the name of said first document.

40. The method of claim 39 wherein said step of naming said first document further comprises applying a compact encoding algorithm to a combination of said associated location values and said identifier of said published item to provide a simplified alpha-numeric name for said first document.

41. The method of claim 37 wherein the published item has an identifier comprising a user-friendly representation of the date or time at which the item was computed.

42. The method of claim 35 wherein said repository is a tree and said secured item is a root of said tree.

43. The method of claim 35 wherein a local entity also performs steps (b) through (f) to form a local repository having a local item to be secured and wherein the local entity subsequently sends a second request comprising said local item to the service bureau which performs steps (b) through (h).

44. The method of claim 43 wherein steps (c) through (f) are performed by said service bureau and the service bureau further performs combining said local item with another hash value.

45. The method of claim 43 further comprising the step of including in the local repository a hash value of a table of contents for a plurality of related documents.

46. The method of claim 43 further comprising the step of including in the local repository a plurality of items corresponding to a plurality of related documents with location information encoded so as to provide first portions of said names that correspond substantially exactly to the logical structure of the relationships among the documents named.

47. The method of claim 35 wherein the step of naming further includes the step of a requester choosing a first portion of said name for naming the first document.

48. The method of claim 47 wherein the step of choosing further includes choosing the first portion of the name to provide information associated with the first document.

49. The method of claim 47 wherein the first portion of the name provides information about the requester for naming the first document.

50. The method of claim 35 wherein the repository is a binary tree.

51. The method of claim 35 wherein the repository is a linked list.

52. The method of claim 35 wherein the step of combining further comprises the step of combining roots of frequently computed trees to form less-frequently computed trees whose roots are in turn combined into linear linked lists.

53. The method of claim 35 further including the step of transmitting the name to a requester and wherein step (h) occurs substantially prior to a time at which an item of the repository is caused to be published.

54. The method of claim 35, further including the step of the service bureau generating a certificate for said first digital document including the self-verifying name.

55. The method of claim 54 further including the step of transmitting the certificate to the author.

56. The method of claim 35, wherein the step of receiving requests further comprises receiving requests from a plurality of users.

57. A certificate authenticating a digital representation of a document, said certificate including a name generated according to the method of claim 35.

58. A method for time stamping a first digital document, comprising the steps of:

a. preparing a first request to time stamp the first digital document, the request including a hash value of the first digital document;

b. combining the first request with a second hash value to generate a composite digital value, the second hash value being dependent at least in part on a second digital document;

c. hashing the composite digital value to generate a first composite hash value; and d. forming a repository of hashed digital values including the first composite hash value, the repository being a directed acyclic graph having nodes, each node comprising a hash value which is dependent on at least one received request, and the repository also having a secured item comprising a hash value dependent at least in part on at least one of the received requests; and e. providing a unique, self-verifying name for the first digital document by:

i. securing an item in the repository;

ii. generating an identifier for the secured item; and iii. providing the unique, self-verifying name for the first digital document using the identifier and location values related to a location of the first digital document with respect to the secured item.

59. The method of claim 58, wherein before the step of combining the first request with the second hash value, receiving the second digital document as part of a second request to time stamp.

60. The method of claim 58, wherein the step of combining further comprises concatenating the first request and the second hash value.

61. The method of claim 58, wherein the step of forming a repository further comprises the steps of:

a. receiving a plurality of requests, each request including a representation of a digital document and forming a node of the repository;

b. combining at least two requests together to form a second composite digital value;

c. hashing the second composite digital value; and d. continuing combining and hashing composite digital values until a secured item in the repository is formed.

62. The method of claim 61, wherein the step of receiving further comprises receiving requests from a plurality of users.

63. The method of claim 58, wherein the second digital document is a pre-existing hash value and the step of forming a repository further comprises the steps of:

a. combining the first composite hash value with a second request, to generate a second composite digital value;

b. hashing the second composite digital value to generate a second composite hash value;

c. combining the second composite hash value with a third request, to generate a third composite digital value;

d. hashing the third composite digital value to generate a third composite hash value; and e. continuing combining requests with composite hash values to generate resultant composite digital values and hashing the resultant composite digital values.

64. The method of claim 58, further comprising after the step of forming a repository:

a. determining an item in the repository to be the secured item; and b. securing the item.

65. The method of claim 64, wherein the step of securing further comprises publishing an item that includes a hash value based at least in part on a request.

66. The method of claim 65, wherein the step of securing further comprises publishing a second item to which the selected item is linked.

67. The method of claim 58, further comprising after the step of forming a repository, generating a certificate.

68. The method of claim 67, wherein the step of generating the certificate further comprises the step of calculating hash values which authenticate the first digital document.

69. The method of claim 68, wherein the step of generating the certificate further comprises the step of calculating location values of the hash values which authenticate the first digital document.

70. The method of claim 67, wherein the step of generating the certificate further comprises including a pointer to the secured item.

71. The method of claim 70, wherein the step of including the pointer further comprises including a time the secured item was secured.

72. The method of claim 58, further comprising the steps of:

a. a user performing the step of generating the request at a local location;

b. after the step of generating, the user transmitting the request to a service bureau;

c. before the step of combining, the service bureau receiving the request; and d. the service bureau performing the steps of combining, hashing, and forming the repository.

73. The method of claim 72, further comprising:

a. the service bureau generating a certificate; and b. the service bureau transmitting the certificate to the user.

74. A certificate providing a unique, self-verifying name to a first digital document, the certificate being generated by:

a. hashing the first digital document to generate a first hash value;

b. combining the first hash value with a second hash value dependent on at least one other digital document to generate a first combined value;

c. hashing the first combined value to generate a first combined hash value;

d. forming a repository of a plurality of hash values in the form of a directed acyclic graph having nodes, each node comprising a hash value dependent on at least one of said digital documents, the repository comprising a secure value derived from a hash value of at least one of said digital documents;

e. generating self-verifying hash values and associated location values in said repository for the first digital document; and f. naming said first digital document using said location values to provide a self-verifying name for the first digital document.

* * * * *